Sept. 13, 1960     O. HIGHLAND     2,952,128
SEALED PRESSURE-EQUALIZING HYDRAULIC BRAKE RESERVOIR
Filed May 9, 1957
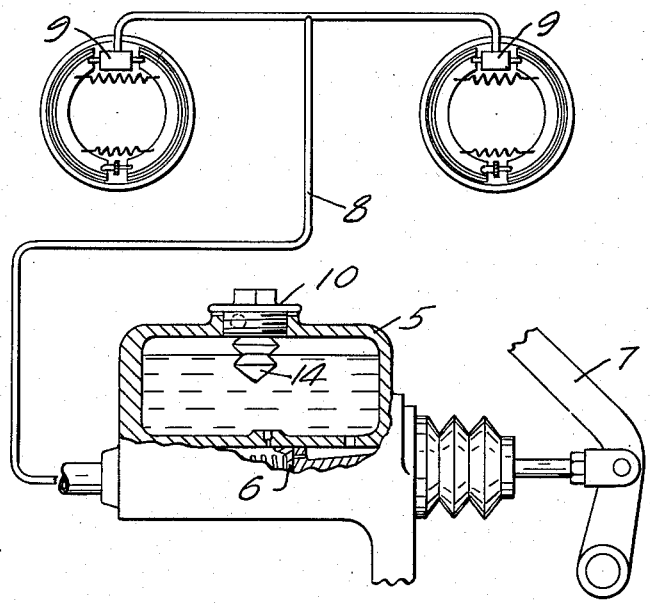
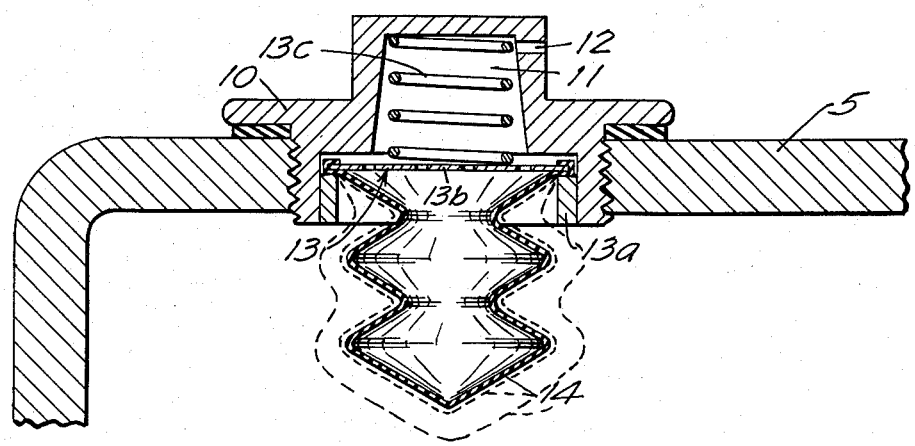
INVENTOR.
OLAF HIGHLAND
BY
Williamson, Schroeder, Adams & Meyers
ATTORNEYS United States Patent Office
2,952,128
Patented Sept. 13, 1960

2,952,128
SEALED PRESSURE-EQUALIZING HYDRAULIC BRAKE RESERVOIR
Olaf Highland, P.O. Box 151, Long Lake, Minn.
Filed May 9, 1957, Ser. No. 658,120
4 Claims. (Cl. 60—54.6)

This invention relates generally to hydraulic brake reservoirs, and particularly to a reservoir constructed to prevent contamination of the fluid confined therein while permitting substantial equalization of the pressure in said reservoir and the ambient surrounding the same.

In the past, contamination of hydraulic brake fluid from the surrounding air through the pressure-equalizing vent conventionally provided in the filler cap of the reservoir, has been a serious problem. This is particularly true in the case of military vehicles which are designed to operate under water. In such installations, the vent into the reservoir must either be closed preventing fluid from the reservoir from flowing into the system or the vent must be elevated through a conduit above the level of the water through which the vehicle is being operated.

It is, therefore, an object of my present invention to provide a hydraulic brake reservoir which is specifically constructed to prevent flow of fluid from the ambient surrounding the reservoir into the reservoir chamber but permitting transmission of pressure between the reservoir and the ambient to equalize the pressures therebetween and permit withdrawal of liquid from the reservoir into the brake-actuating master cylinder mechanism.

It is another object to provide a reservoir particularly designed for use with hydraulic brake systems incorporating a check valve for releasing excessive reservoir pressure but providing a greatly expansible partition or bellows member forming a positive seal to prevent flow of ambient fluid into the reservoir but permitting sufficient expansion thereof to substantially impose the pressure of the ambient on the liquid within the reservoir chamber and thereby permit the liquid within the reservoir to be withdrawn therefrom without contamination.

More specifically, it is an object to provide a hydraulic brake reservoir filler cap incorporating an outwardly releasing check valve to relieve excessive pressures within the reservoir but providing a greatly expansible bellows member communicating with the ambient through a vent passage in said filler cap to maintain the ambient pressure on the liquid in said reservoir and thereby permit withdrawal of said liquid therefrom.

These and other objects and advantages of my invention will more fully appear from the following description, made in connection with the accompanying drawings, wherein like reference characters refer to the same parts throughout the several views and in which:

Figure 1 is a diagrammatic view showing my reservoir as incorporated into a conventional hydraulic brake system; and Figure 2 is a vertical sectional view of a filler cap as mounted in a reservoir and embodying my invention.

As illustrated in the accompanying drawing, I provide a reservoir designated by the numeral 5 and, in the form illustrated, said reservoir is designed to supply hydraulic liquid to a brake-actuating piston 6 working in a master cylinder mechanism of conventional design and responsive for actuation to the manually controlled foot lever 7 which is also of conventional design. The piston 6 forces the hydraulic liquid out of the cylinder through a conduit 8 and into the wheel cylinders 9 of the brake system.

As best shown in Figure 2, the form of my invention illustrated embodies a removable filler cap 10 screw-threaded into the upper portion of the reservoir 5. The cap 10 has a hollow chamber 11 formed therein and said chamber is vented to the ambient air surrounding said reservoir through a vent passage 12. An outwardly releasing check valve assembly is designated as an entirety by the numeral 13 and embodies a valve seat 13a and an apertured disc-like valve element 13b which is normally held in seated relation against the seat 13a as by a spring 13c. The valve element has communication openings formed through intermediate portions thereof and an expansible sealing and pressure-equalizing member such as the bellows 14 has its upper open end connected with said valve element and the inside chamber defined therewithin communicates with the ambient air through the openings in the valve element 13b, the chamber 11 and the passage 12 formed in the upper portion of the cap 10. The expansible pressure-equalizing member 14 is made from any suitable material capable of being readily expanded into a substantially larger volume such as soft latex rubber composition specifically constructed to prevent deterioration thereof by the hydraulic brake fluid confined within the reservoir 5. The expansible chamber within the member 14 permits equalization of pressures within the reservoir 5 and the surrounding ambient atmosphere. Obviously, if the pressure within the reservoir increases beyond a predetermined limit, the bellows 14 could conceivably be completely collapsed without entirely releasing this pressure. Therefore, to prevent excessive pressure from being retained within the reservoir 5, the spring-pressed check valve 13 is provided which releases any pressure sufficient to overcome the spring 13c. However, it is obvious that the check valve will prevent contamination of the hydraulic brake fluid by positively sealing off communication from the ambient air into said fluid.

It will be seen that I have provided a relatively simple, yet highly efficient reservoir for hydraulic brake systems which is particularly designed to prevent contamination of the fluid confined within the reservoir by sealing off communication into the reservoir from the ambient surrounding the same, but permitting release of excessive pressures within the reservoir by providing an outwardly releasing check valve to prevent dangerous brake applying pressures from being maintained within the reservoir. This invention permits underwater operation of a vehicle without permitting water to pass into the reservoir to contaminate the hydraulic liquid therein. It also obviously prevents other harmful elements carried by the surrounding air from passing into the reservoir and contaminating the liquid.

It will, of course, be understood that various changes may be made in the form, details, arrangement and proportions of the parts without departing from the scope of my invention.

What is claimed is:

1. A reservoir for hydraulic brake systems and the like, comprising means defining a fluid confining chamber having an opening formed through the chamber wall, a check valve mounted in said opening and permitting fluid flow from said chamber outwardly into the ambient surrounding the same, said check valve having a pressure equalizing opening formed therethrough, and a readily expansible member mounted across said check valve opening to prevent fluid communication from the ambient into said chamber, and said expansible member being constructed to permit sufficient expansion thereof within said chamber to equalize the pressure in said chamber with the pressure of said ambient.

2. A reservoir for hydraulic brake systems and the like comprising a fluid confining reservoir having a top wall with a pressure equalizing opening formed therein, a valve seat having an annular sealing portion, a check valve in said opening and including a disc-shaped valve element spring pressed inwardly against the sealing portion of the valve seat to prevent inflow of fluid around the periphery of the valve element and into the reservoir and to permit outflow of fluid around the periphery of the valve element from the reservoir for equalizing pressure in the reservoir with the ambient fluid, the valve element having an opening formed therethrough, and an inflatable member within the reservoir and defining an internal chamber of expandable volume, the inflatable member having an open end portion sealed to the valve element around the opening therethrough to expand under vacuum pressure within the reservoir and permit inflow of ambient fluid through the opening in the valve element into the internal chamber of the inflatable member, whereby to cause the pressure within the reservoir to equalize to the ambient fluid pressure.

3. The invention as defined in claim 2, wherein said inflatable member is constructed of resilient material to normally return to deflated condition when pressures permit and to discharge the fluid in the internal chamber thereof through the opening in the valve element before the valve element is moved to permit expelling of fluid from the reservoir, the inflatable member being sealed to the peripheral edge of the valve element and being seatable against the valve seat to provide a sealed relationship between the valve element and the seat.

4. Apparatus for equalizing pressure within a brake fluid reservoir to the ambient pressure comprising a reservoir filler cap having an outer end and an externally threaded inner end emplaceable in the reservoir wall and said cap also having an internal chamber therein opening through said inner end, said outer end having a vent passage therethrough in communication with said chamber, check valve means in said chamber, said check valve means including a valve element having an aperture therethrough, and an inflatable member defining an internal compartment therewithin of expandable volume, said inflatable member having an open end with a peripheral edge sealed to the valve element around said aperture and said inflatable member extending from the valve element toward the inner end of the cap, said check valve means being so constructed and arranged as to permit fluid flow outwardly around the periphery of the valve element from said reservoir to said vent passage and preventing fluid flow inwardly around the periphery of the valve element from the vent passage to said reservoir.

References Cited in the file of this patent
UNITED STATES PATENTS

| | | |
|---|---|---|
| 337,118 | Belden | Mar. 2, 1886 |
| 1,680,204 | Charles | Aug. 7, 1928 |
| 1,758,671 | Loughead et al. | May 13, 1930 |
| 2,152,485 | Kindl | Mar. 28, 1939 |
| 2,596,238 | Groves | May 13, 1952 |
| 2,597,050 | Audemar | May 20, 1952 |